(12) United States Patent
Draese

(10) Patent No.: US 8,312,050 B2
(45) Date of Patent: Nov. 13, 2012

(54) AVOIDING DATABASE RELATED JOINS WITH SPECIALIZED INDEX STRUCTURES

(75) Inventor: Oliver Draese, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 12/350,737

(22) Filed: Jan. 8, 2009

(65) Prior Publication Data

US 2009/0182766 A1    Jul. 16, 2009

(30) Foreign Application Priority Data

Jan. 16, 2008  (EP) .................................. 08100528

(51) Int. Cl.
*G06F 17/30* (2006.01)
(52) U.S. Cl. ........ 707/797; 707/793; 707/801; 707/802; 707/807
(58) Field of Classification Search .................. 707/1, 3, 707/100, 102, 104, 793, 797, 801, 802, 803, 707/807
See application file for complete search history.

(56) References Cited

U.S. PATENT DOCUMENTS

| | | | | |
|---|---|---|---|---|
| 6,029,170 A | * | 2/2000 | Garger et al. | 707/999.001 |
| 6,567,815 B1 | * | 5/2003 | Rubin et al. | 707/999.002 |
| 6,654,760 B2 | * | 11/2003 | Baskins et al. | 707/999.101 |
| 7,194,456 B2 | * | 3/2007 | Longshaw | 707/999.003 |
| 7,315,862 B1 | * | 1/2008 | Crump et al. | 707/999.001 |
| 7,788,287 B2 | * | 8/2010 | Mazzagatti | 707/803 |
| 2002/0087596 A1 | * | 7/2002 | Lewontin | 707/513 |

FOREIGN PATENT DOCUMENTS

EP    1811383 A1 *  7/2007

* cited by examiner

*Primary Examiner* — Dangelino Gortayo
(74) *Attorney, Agent, or Firm* — Douglas H. LeFeve; Edell, Shapiro & Finnan, LLC

(57) ABSTRACT

Provided is a solution for storing data, the data comprising a set of tables, each table comprising a set of columns, each column comprising a set of values, each value being one or more data types. In the solution, a binary tree can be created for each of the data types. Each binary tree can comprise a set of nodes. A set of arrays can be associated with each node of the binary tree. The array associated with each node of each binary tree can correspond to one of the columns that comprises the value of the data type represented by the node of the binary tree. Each array can indicate at least one table row and column from the plurality of tables in which the value of the data type represented by the node of the binary tree occurs.

20 Claims, 6 Drawing Sheets

| Product | | | 300 |
|---|---|---|---|
| ID | GroupID | Price | |
| 0 | 100 | 300 | |
| 1 | 300 | 13 | |
| 2 | 355 | 56 | |
| 3 | 300 | 100 | |
| 4 | 355 | 355 | |
| ... | ... | ... | |
| # | # | # | |

| Product Group | | 310 |
|---|---|---|
| ID | Name | |
| 100 | COMPUTER | |
| 200 | SERVICES | |
| 300 | TOYS | |
| ... | ... | |
| # | ZEBRAS | |

600

| Product.GroupID | Product.Price | Product.ID |
|---|---|---|
| 1 | 0 | 2 |
| 3 | ... | ... |
| ... | # | # |
| # | | |

| Row ID |
|---|
| 0 |
| 1 |
| 2 |
| 3 |
| 4 |
| ... |
| # |

| GroupID | Price |
|---|---|
| 3 | 2 |
| 2 | 1 |
| 4 | 0 |
| 2 | 3 |
| 4 | 4 |
| ... | ... |
| # | # |

| Row ID |
|---|
| 0 |
| 1 |
| 2 |
| ... |
| # |

| ID | Name |
|---|---|
| 3 | 1 |
| 5 | 0 |
| 2 | 2 |
| ... | ... |
| # | 3 |

AVOIDING DATABASE RELATED JOINS WITH SPECIALIZED INDEX STRUCTURES

CROSS-REFERENCE TO RELATED APPLICATIONS

This application claims the benefit of European Patent Application No. 08100528.2 filed 16 Jan. 2008, entitled "AVOIDING DATABASE RELATED JOINS WITH SPECIALIZED INDEX STRUCTURES", which is assigned to the assignee of the present application, and the teachings of which are hereby incorporated by reference in their entirety.

BACKGROUND

The present invention relates to data processing and more specifically to data structures in data processing systems.

In a relational database, data is stored in different tables. These tables may be bound together using referential integrity. For instance, data may be split into fact and dimension tables. The dimension tables define different key/value tuples with unique keys and descriptive values. The fact tables then reference this information.

Where tables reference other tables, the time taken for query execution is not optimal. Joins between tables increase the amount of processing required for a query.

Hybrid tree array databases have been contemplated. Such a database provides flexibility, allowing fast key searching typical of a tree database, and sequential searching of all data fields typical of an array database. It does not, however, address the problem of querying data stored over joined relational database tables.

SUMMARY

According to an embodiment of the present invention, there is provided a method of storing data. The data comprises a set of tables, each table comprising a set of columns, each column comprising a set of values, each value being one or more data types. In the solution, a binary tree can be created for each of the data types. Each binary tree can comprise a set of nodes. A set of arrays can be associated with each node of the binary tree. The array associated with each node of each binary tree can correspond to one of the columns that comprise the value of the data type represented by the node of the binary tree. Each array can indicate at least one table row and column from the plurality of tables in which the value of the data type represented by the node of the binary tree occurs.

According to an embodiment of the present invention, there is provided a computer program product. The computer program product includes software code portions for performing a method in accordance with an embodiment of the present invention when the program is run on a data processing system.

According to an embodiment of the present invention, there is provided a data processing system for storing data. The data comprises a set of tables, each table comprising a set of columns, each column comprising a set of values, each value being one or more data types. In the solution, a binary tree can be created for each of the data types. Each binary tree can comprise a set of nodes. A set of arrays can be associated with each node of the binary tree. The array associated with each node of each binary tree can correspond to one of the columns that comprise the value of the data type represented by the node of the binary tree. Each array can indicate at least one table row and column from the plurality of tables in which the value of the data type represented by the node of the binary tree occurs.

According to an embodiment of the present invention, there is provided a data structure. The data structure stores data. The data comprises a set of tables, each table comprising a set of columns, each column comprising a set of values, each value being one or more data types. In the solution, a binary tree can be created for each of the data types. Each binary tree can comprise a set of nodes. A set of arrays can be associated with each node of the binary tree. The array associated with each node of each binary tree can correspond to one of the columns that comprise the value of the data type represented by the node of the binary tree. Each array can indicate at least one table row and column from the plurality of tables in which the value of the data type represented by the node of the binary tree occurs.

BRIEF DESCRIPTION OF THE SEVERAL VIEWS OF THE DRAWINGS

FIGS. 6-8 show tables containing data.

DETAILED DESCRIPTION

Figure 1:
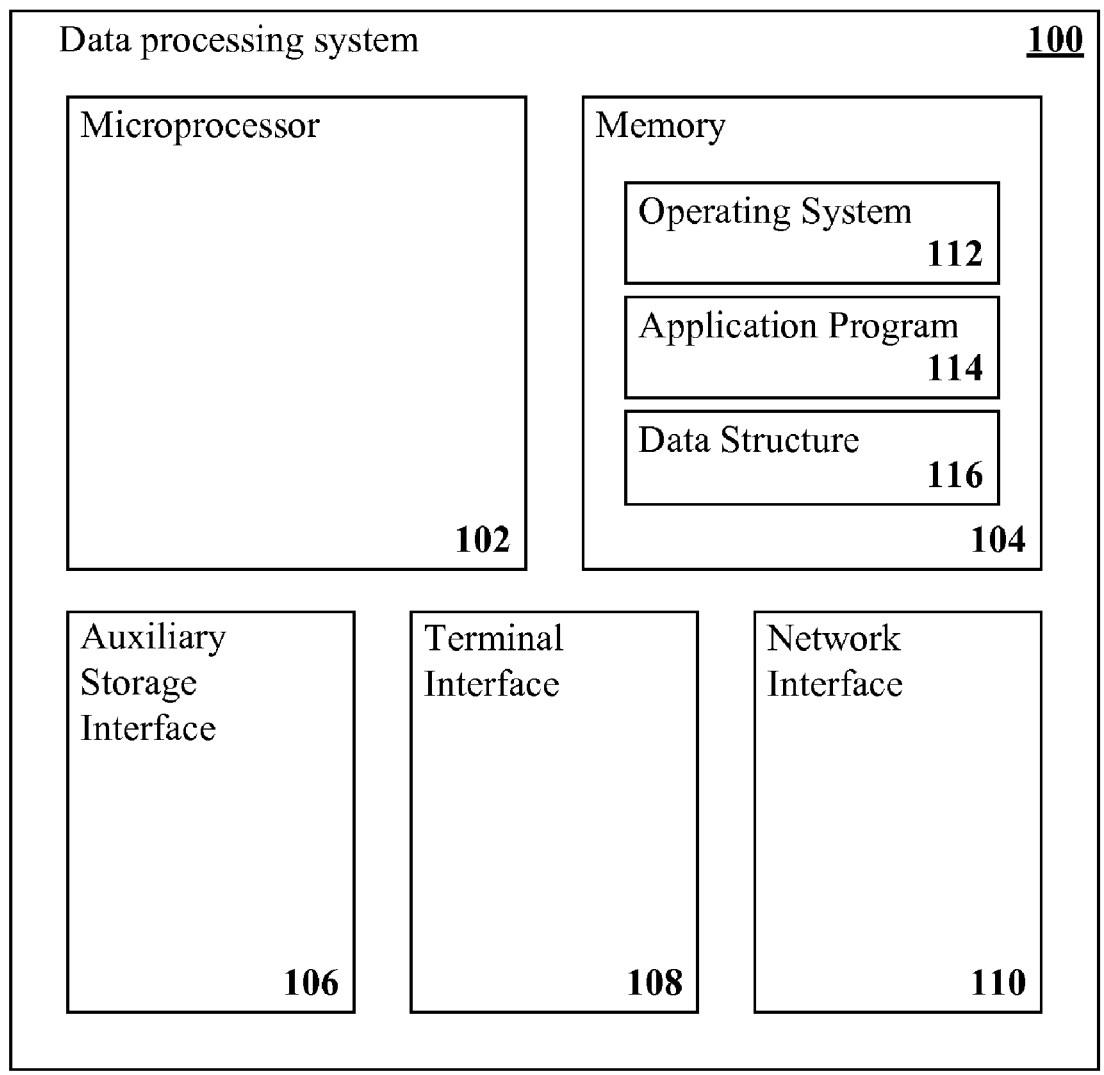
FIG. 1 shows a block diagram of a data processing system.

FIG. 1 shows a block diagram of a data processing system 100. The data processing system 100 includes microprocessor 102, memory 104, auxiliary storage interface 106, terminal interface 108, and network interface 110. These components may be interconnected through the use of a system bus. Auxiliary storage interface 106 may be used to connect mass storage devices which store data to the data processing system 100.

Memory 104 contains an operating system 112, an application program 114, and data structure 116. Data structure 116 is used to provide data storage that avoids the problems caused by joins between tables. Methods for creating and querying data structure 116 are described below. Data processing system 100 can utilize well known virtual addressing mechanisms that allow programs of data processing system 200 to behave as if they only have access to a large, single storage entity instead of accessing multiple, smaller storage entities such as memory 104, and any mass storage devices connected via auxiliary storage interface 106. Therefore, while operating system 112, application 114 and data structure 116 are shown to reside in memory 104, those skilled in the art will recognize that these programs are not necessarily all completely contained in memory 104 at the same time. It should also be noted that the term memory is used here to generically refer to the entire virtual memory of data processing system 100.

Although data processing system 100 is shown to contain only a single main microprocessor, those skilled in the art will appreciate that the present invention may be practiced using a data processing system that has multiple microprocessors, and/or multiple busses.

Terminal interface 108 is used to directly connect one or more terminals to data processing system 200. These terminals may be non-intelligent or fully programmable workstations, and are used to allow system administrators and users to communicate with data processing system 100.

Network interface 110 is used to connect other computer systems and/or workstations to data processing system 100 in networked fashion. For instance, the network interface can include a connection to the internet and the World Wide Web, or internal web-based systems (typically called intranets). The present invention applies equally no matter how data processing system 100 may be connected to other computer systems and/or workstations, regardless of whether the connection is made using present day analogue and/or digital techniques or via some networking mechanisms of the future.

Operating system 112 can be any operating system, such as windows, AIX etc., and those skilled in the art will appreciate that the spirit and scope of the present invention is not limited to any one operating system.

Application program 114 can be any type of application program which accesses data stored in data structure 116. Thus, the application could include a computerized catalogue, process documentation, inventory, personal lists, or data warehouses to name several examples.

Figures 2, 3:
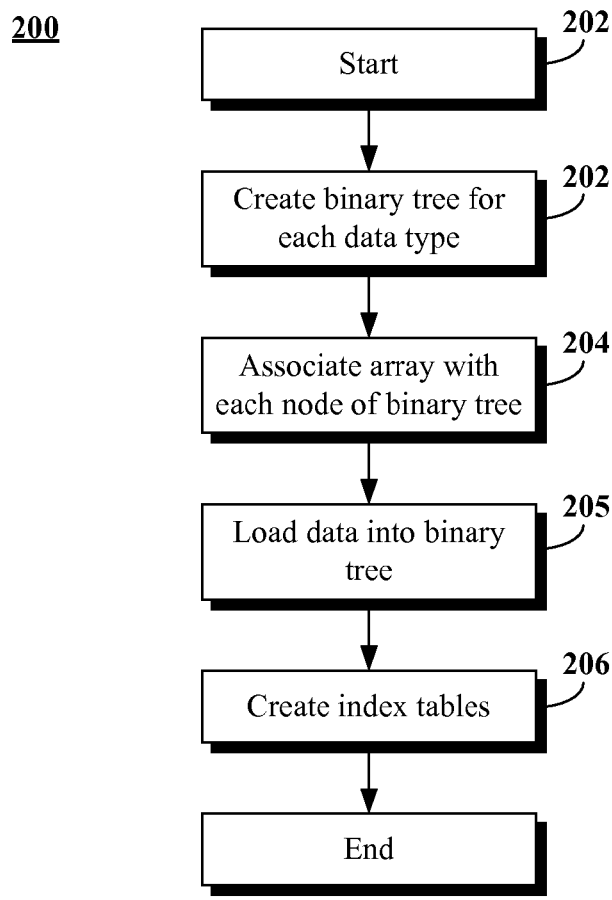
FIG. 2 shows a flow diagram illustrating steps performed in a method of storing data.
FIG. 3 shows tables containing data.

FIG. 2 shows a method 200 for storing data from relational data tables in a binary tree. In step 202, a binary tree is created for each data type. Data types include, for instance, integer, character, string, and other data types known to those skilled in the art. In step 204, an array is associated with each node of the binary tree. The array associated with each node of the binary tree indicates where the value of the data type corresponding to the node of the binary tree occurs in the original relational table. In step 205, data is loaded from relational database systems into these tree structures where each different value occurrence results in a new tree node. Each tree node stores the information where the value was original existing in the relational database table as RowID value. In step 206, index tables are created from the original relational tables containing the indexes of the nodes on the binary tree having the value contained in that location of the original relational data table.

Methods consistent with the invention are described below with reference to an example given in FIG. 3.

FIG. 3 shows relational data tables 300 and 310. Table 300 contains data relating to products, and table 310 contains data relating to product groups. The column [GroupID] in table 300 references the column [ID] in table 310. Thus, a join between tables 300 and 310 is defined.

Figure 4:
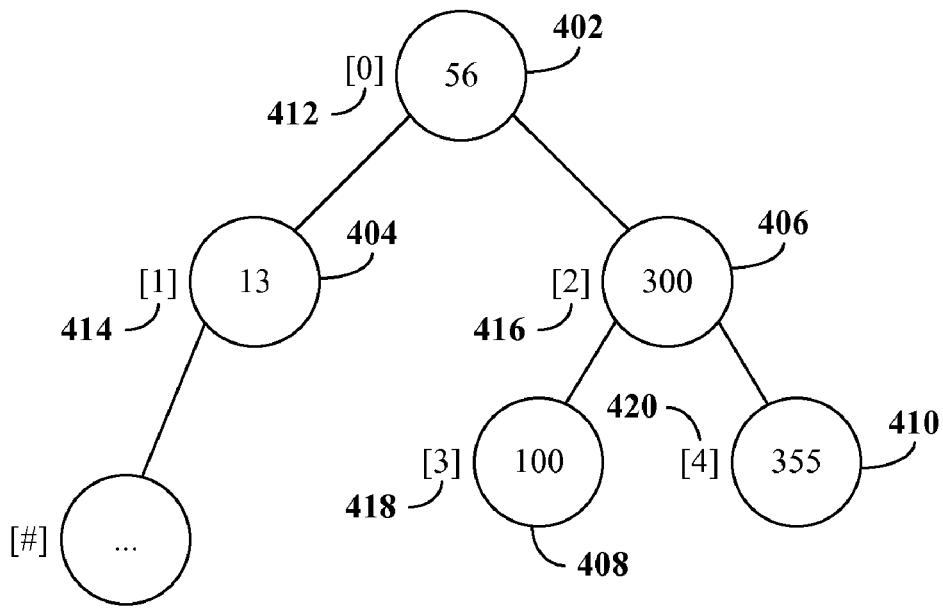
FIG. 4 shows a binary tree.

FIG. 4 shows a binary tree created from tables 300 and 310 for the data type integer. Binary tree 400 has nodes 402, 404, 406, 408, and 410. The nodes have indices 412, 414, 416, 418, and 420. Associated with each node are arrays (one per column of the set of columns of the data type, represented by the tree) containing data indicative of where the value of the node occurred in the tables 300 and 310.

Figure 5:
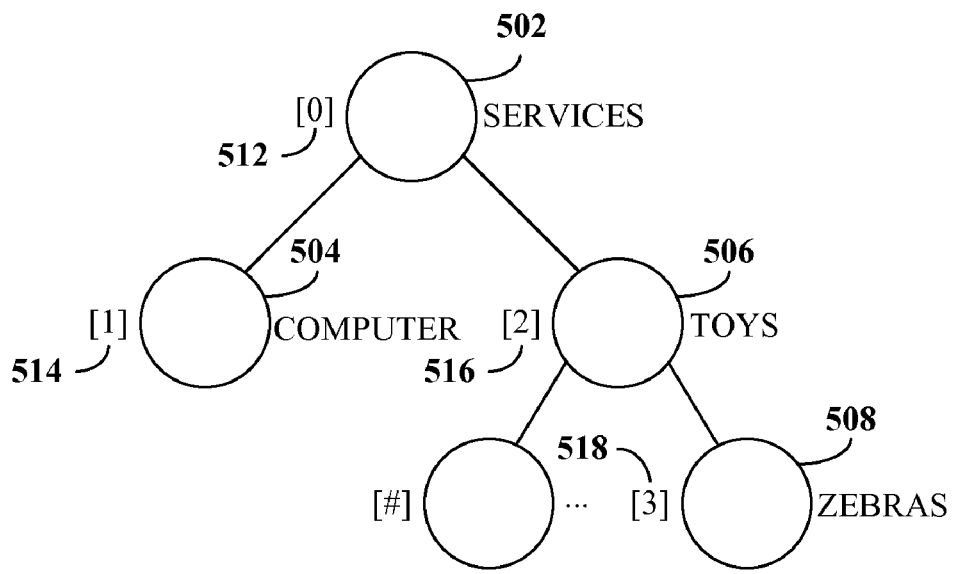
FIG. 5 shows a binary tree.

FIG. 5 shows a binary tree 500 for the data type string. Binary tree 500 has nodes 502, 504, 506, and 508. The nodes on binary tree 500 have indices 512, 514, 516 and 518.

FIG. 6 shows three arrays associated with node 406 of binary tree 400. Table 600 (representing the three arrays as columns) indicates where the value of node 406 (which is 300) occurred in tables 300 and 310. Table 600 shows the row ID where the value 300 occurs in the columns of tables 300 and 310.

FIG. 7 shows an index table created showing the indices where the values of binary tree 400 occurred in table 300.

FIG. 8 shows an index table showing the indices where the values in table 310 occur in binary trees 400 and 500.

The execution of a query on a data structure consistent with an embodiment of the present invention is described below with reference to FIGS. 9-13.

Figures 9, 10, 11:
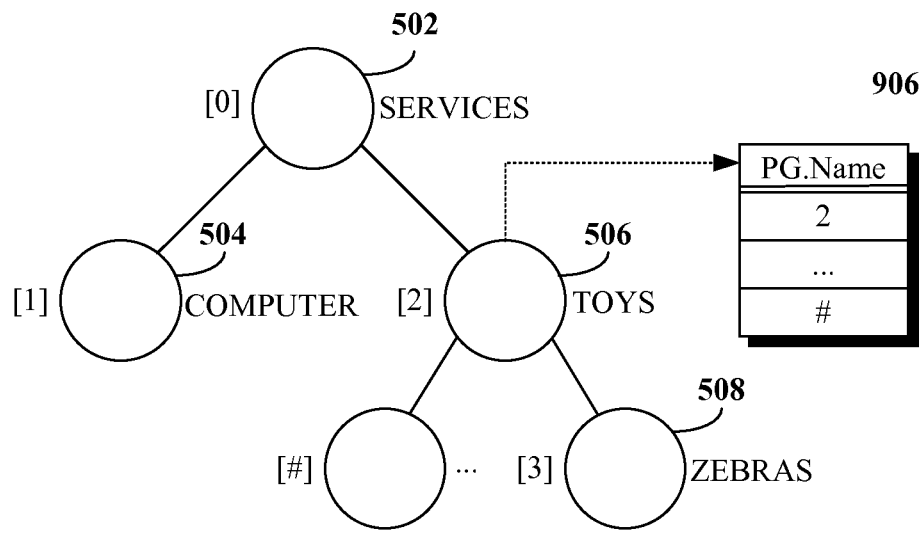
FIGS. 9-13 show steps involved in the execution of a query.

The query used as an example here is the determination of the all the product prices for products in the product group toys. The first step as shown in FIG. 9 involves finding the node in the tree 500 containing the searched value toys. This is node 506. The array associated with node 506, denoted by 906 in FIG. 9 is then accessed to determine the row ID of the index table product group which corresponds to the string value toys.

FIG. 10 shows this lookup in index table 800 with the row ID 2 and the value index for the [NAME] as well as for [ID] index is 2.

FIG. 11 shows the lookup of the index in the tree 400 corresponding to the product [ID] which in turn corresponds to the product group name 'toys'. Once this index is known, tree 400 can be accessed directly via this index to determine the product IDs from the table corresponding to the index 2.

Figures 12, 13:
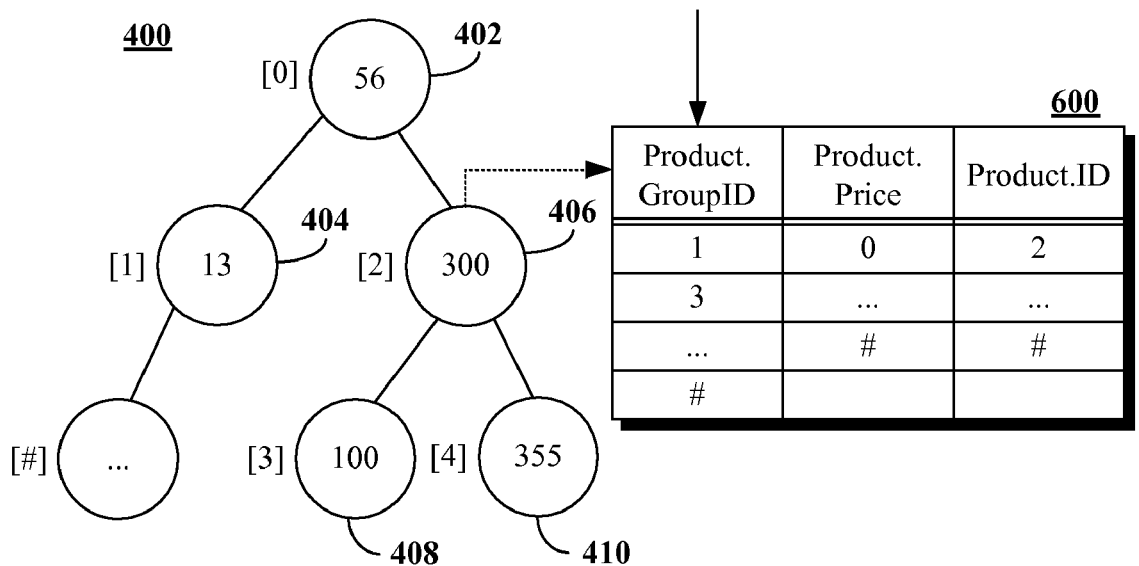

FIG. 12 shows the node 406, representing the index 2 and having the value 300 within the tree 400. This returns all row ID for the column [GroupID] within the product table 600. The column product [ID] of table 600 thus returns the row IDs of the required products.

FIG. 13 shows the lookup in table 700 of the prices for the products having the row ID numbers determined from table 600. Thus a list of products can be generated without any further index or data scan.

Embodiments of the invention may be implemented as an accelerator for an existing database system. The methods and systems described herein may be part of a database system in addition to relational database tables. Part of the data may be kept in a mainframe, and parts may be off loaded to non-mainframe systems such as blades where the memory costs are reduced. Queries and searches may be split between the accelerator and a relational database system. Parts of an access graph may be processed using the methods and systems described above, with other parts processed using other techniques.

The invention can take the form of an entirely hardware embodiment, an entirely software embodiment, or an embodiment containing both hardware and software elements. In one embodiment, the invention is implemented in software which includes but is not limited to firmware, resident software, microcode, etc.

Furthermore, the invention can take the form of a computer program product accessible from a computer usable, or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared or semiconductor system (or apparatus or device) or a propagation medium. Examples of a computer readable medium include a semiconductor or solid state memory, magnetic tape, a removable computer diskette, a random access memory, a read only memory, a rigid magnetic disc and an optical disc. Current examples of optical discs include compact disc read only memory, compact disc read/write, and DVD.

A data processing system suitable for storing and/or executing program code will include at least one processor coupled directly or indirectly to memory elements through a system bus. The memory elements can include local memory employed during execution of the program code bulk storage and cache memories which provide temporary storage of at least some program code in order to reduce the number of times code must be retrieved from bulk storage during execution.

Input/output or I/O devices (including but not limited to keyboards, displays, pointing devices, etc) can be coupled to the system directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method of storing data comprising:
   identifying a relational database comprising a plurality of tables bound to each other using referential integrity, each of the plurality of tables comprising a plurality of columns and rows, each of the plurality of columns corresponding to a data type of a plurality of different data types, each of the rows of each of the tables having a unique Row ID value, each unique row and column cell of each table being able to store a value for that cell;
   creating a binary tree for each of the one or more data types, each binary tree comprising a plurality of nodes, each of the plurality of nodes representing a value of an associated data type;
   associating a plurality of arrays with the plurality of nodes of each binary tree, wherein the array associated with each node of each binary tree corresponds to one of the plurality of columns that comprises the value of the data type represented by the node of the binary tree, each array indicating at least one table row and column from the plurality of tables in which the value of the data type represented by the node of the binary tree occurs; and
   loading data from the relational database into the set of created binary trees, where each different value occurrence of the relational database results in a new tree node of the set of binary trees, wherein each node of the binary trees stores information for where the value originally existed in the relational database by RowID value.

2. The method of claim 1, further comprising:
   creating an index table for each of the plurality of tables, the index tables comprising indices indicating the index of the node in the binary tree in which the value of a source table is stored.

3. The method of claim 1, further comprising height balancing the binary tree to form an AVL tree.

4. The method of claim 1, further comprising:
   storing the data in a hybrid tree, with array elements each containing tree node data and array data.

5. The method of claim 1, wherein at least one of the plurality of tables comprises a value in another of the plurality of tables defining a referential relation, used for join operations.

6. The method of claim 1, the data changing over time, the method further comprising:
   creating a further binary tree comprising the changed data.

7. A computer program product stored in a non-transitory storage medium for execution on a data processing system, said execution of the computer program product causing the data processing system to:
   detect a relational database comprising a plurality of tables bound to each other using referential integrity, each of the plurality of tables comprising a plurality of columns and rows, each of the plurality of columns corresponding to a data type of a plurality of different data types, each of the rows of each of the tables having a unique RowID value, each unique row and column cell of each table being able to store a value for that cell;
   create a binary tree for each of one or more data types, each binary tree comprising a plurality of nodes, each of the plurality of nodes representing a value of an associated data type;
   associate a plurality of arrays with the plurality of nodes of each binary tree, wherein the array associated with each node of the binary tree corresponds to one of the plurality of columns that comprises the value of the data type represented by the node of the binary tree, each array indicating at least one table row and column from the plurality of tables in which the value of the data type represented by the node of the binary tree occurs;
   load data from the relational database into the set of created binary trees, where each different value occurrence of the relational database results in a new tree node of the set of binary trees, wherein each node of the binary trees stores information for where the value originally existed in the relational database by RowID value.

8. The computer program product of claim 7, said execution of the computer program product causing the data processing system to:
   create an index table for each of the plurality of tables, the index tables comprising indices indicating the index of the node in the binary tree in which the value of a source table is stored.

9. The computer program product of claim 7, said execution of the computer program product causing the data processing system to height balance the binary tree to form an AVL tree.

10. The computer program product of claim 7, said execution of the computer program product causing the data processing system to:
    store the data in a hybrid tree, with array elements each containing tree node data and array data.

11. The computer program product of claim 7, wherein at least one of the plurality of tables includes a value in another of the plurality of tables defining a referential relation, used for join operations.

12. The computer program product of claim 7, the data changing over time, said execution of the computer program product causing the data processing system to:
    create a further binary tree comprising the changed data.

13. A device for storing and processing data, the device comprising:
    a processor for creating binary trees from relational database tables, storing these binary trees in a non-transitory storage medium, and for reading binary trees from the non-transitory storage medium, and for updating data maintained within the binary trees from the non-transitory storage medium;
    at least one non-transitory storage medium storing the binary trees, each of the binary trees comprising a plurality of nodes, each node representing a value of an associated data type in accordance with columns of the relational database tables; and
    at least one non-transitory storage medium for a plurality of arrays associated with the plurality of nodes of each of the binary trees, wherein the array associated with each node of each binary tree corresponds to one of the plurality of columns that comprises the value of the data type represented by the node of the binary tree, each array indicating at least one table row and column from the relational database tables in which the value of the data type represented by the node of the binary tree occurs;

wherein the processor further loads data from the relational database into the set of created binary trees, where each different value occurrence of the relational database results in a new tree node of the set of binary trees, wherein each node of the binary trees stores information for where the value originally existed in the relational database by RowID value.

14. The device of claim 13, further comprising a plurality of index tables, each of the plurality of index table associated with one of the plurality of tables, the index tables comprising indices indicating the index of the node in the binary tree in which the original table value is stored.

15. The device of claim 13, the binary tree being an AVL tree.

16. The device of claim 13, further comprising a further binary tree, the further binary tree having a plurality of nodes comprising changes to the data.

17. A data processing system for storing data, the data comprising a plurality of tables, each of the plurality of tables of a relational database comprising a plurality of columns, each of the plurality of columns comprising a plurality of values, each of the plurality of values being one or more data types, the data processing system comprising:

a processor for creating a binary tree for each data type from the tables of the relational database, each binary tree comprising a plurality of nodes, each of the plurality of nodes representing a value of an associated data type from the tables of the relational database;

at least one non-transitory storage medium for the binary tree; and at least one non-transitory storage medium for a plurality of arrays, wherein the array associated with each node of each binary tree corresponds to one of the plurality of columns that comprises the value of the data type represented by the node of the binary tree, each array indicating at least one table row and column from the plurality of tables in which the value of the data type represented by the node of the binary tree occurs, wherein each node of each binary tree has a set of one or more of the arrays associated with it, wherein a quantity of arrays in the set of arrays per node is equivalent to the number of columns from the tables of the relational database having the data type to which the node corresponds;

wherein the processor further loads data from the relational database into the set of created binary trees, where each different value occurrence of the relational database results in a new tree node of the set of binary trees, wherein each node of the binary trees stores information for where the value originally existed in the relational database by RowID value.

18. The data processing system of claim 17, further comprising storage for an index table from each of the plurality of tables, each index table comprising indices indicating the index of the node in the binary tree in which the original table value is stored.

19. The data processing system of claim 17, the processor further operable for height balancing the binary tree to form an AVL tree.

20. The data processing system of claim 17, the storage for the binary tree and the storage for an array comprising storage for a hybrid tree with array elements, each containing tree node data and array data.

* * * * *